(12) United States Patent
Ouellette

(10) Patent No.: US 6,290,435 B1
(45) Date of Patent: Sep. 18, 2001

(54) SPACING TOOL FOR USE WITH BOTTLE CONVEYOR

(75) Inventor: Joseph F. Ouellette, St. Louis, MO (US)

(73) Assignee: Ouellette Machinery System, Inc, Fenton, MO (US)

( * ) Notice: Subject to any disclaimer, the term of this patent is extended or adjusted under 35 U.S.C. 154(b) by 0 days.

(21) Appl. No.: 09/464,493

(22) Filed: Dec. 15, 1999

(51) Int. Cl.[7] .................................................. B65G 51/00

(52) U.S. Cl. ..................... 406/198; 198/866; 33/501.45

(58) Field of Search ........................... 198/866; 426/198; 33/501.45

(56) References Cited

U.S. PATENT DOCUMENTS 2,238,515 * 4/1941 Bath .................................. 33/501.45

* cited by examiner

*Primary Examiner*—H. Grant Skaggs
*Assistant Examiner*—Joe Dillon, Jr.
(74) *Attorney, Agent, or Firm*—Howell & Haferkamp

(57) ABSTRACT

A spacing tool is adapted for use with a conveyor that conveys plastic bottle containers of the type having a neck ring, a neck below the neck ring, and a body below the neck. The conveyor has a pair of support flanges that are spaced laterally from one another by a distance smaller than an outer diameter dimension of each container neck ring, but larger than an outer diameter dimension of each container neck. Thus, each container can be supported between the flanges with its neck ring in engagement with upper surfaces of the flanges. The conveyor has a pair of container guide rails that are spaced from one another by a distance larger than an outer diameter dimension of each container body so that each container can move along the conveyor between the guide rails. The spacing tool comprises a spacing member having a head portion, a neck portion below the head portion, and a spacing block below the neck portion. The head portion has a first outer diameter dimension larger than the spacing between the flanges. The neck portion has a second outer diameter dimension smaller than the spacing between the flanges. Thus, the spacing member can be supported with the head portion in engagement with the upper surfaces of the flanges, with the neck portion between the flanges, and with the spacing block suspended below the flanges adjacent the guide rails. The spacing block has a third outer diameter dimension substantially equal to the outer diameter dimension of each container body (i.e., slightly larger than the third outer diameter dimension to allow for clearance of the containers between the guide rails) so that the spacing member can be used to calibrate the lateral spacing between the guide rails.

13 Claims, 3 Drawing Sheets

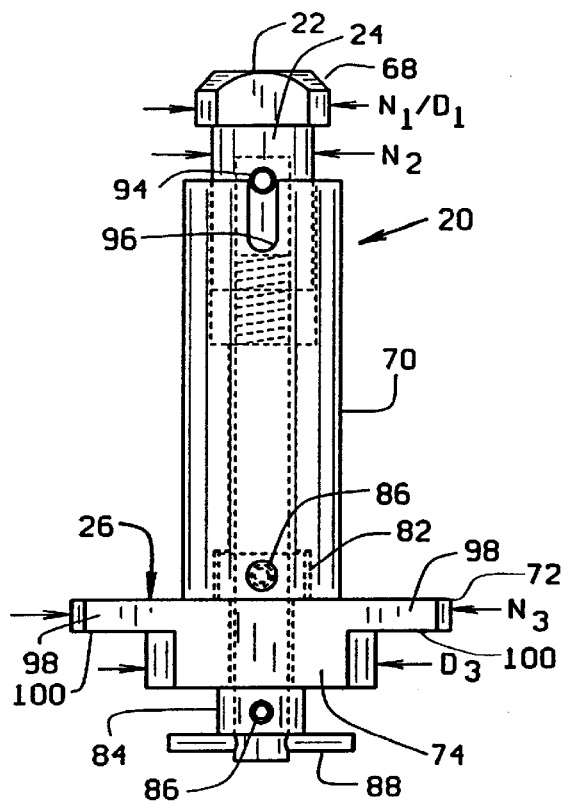
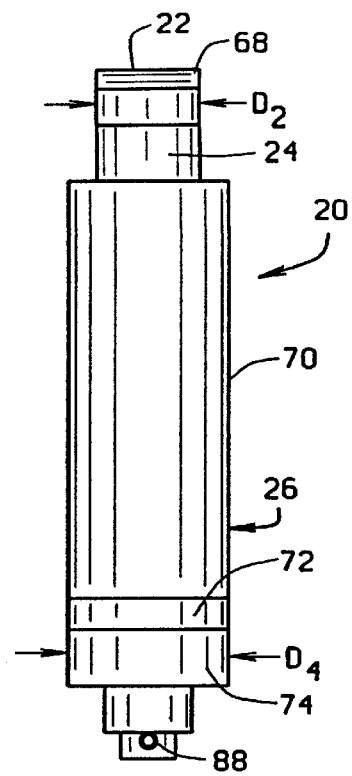
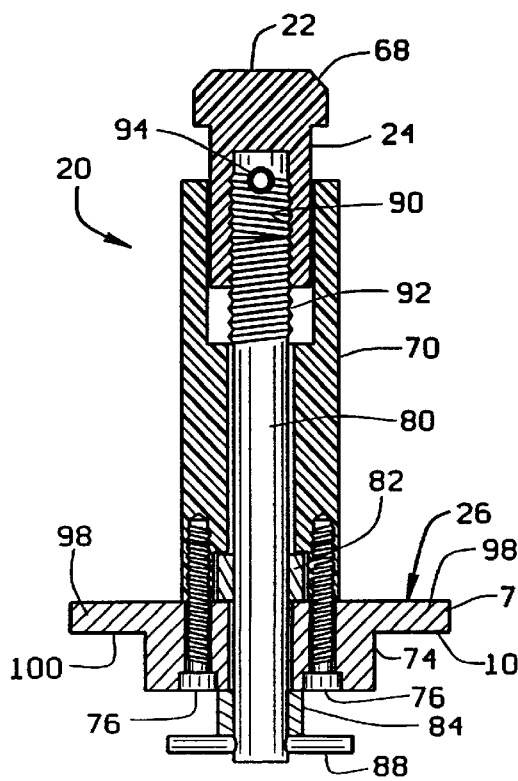
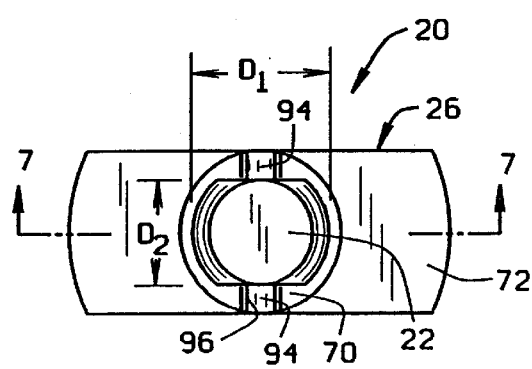
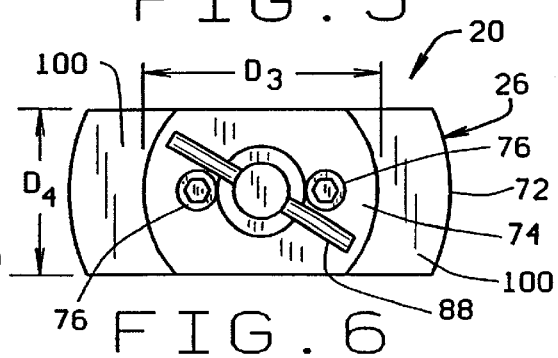
FIG. 3
FIG. 4
FIG. 5
FIG. 7
FIG. 6

SPACING TOOL FOR USE WITH BOTTLE CONVEYOR

BACKGROUND OF THE INVENTION (1) Field of the Invention

The present invention pertains to a spacing tool for use with air conveyors. In particular, the present invention relates to a spacing tool that can be used for calibrating the spacing between the guide rails of an air conveyor that transports plastic bottle containers along a conveying path defined by a pair of flanges and the guide rails.

(2) Description of the Related Art

Air conveyors are typically employed in the rapid transport of empty plastic bottle containers. FIG. 1 is an end elevational view of a typical prior art air conveyor apparatus. In FIG. 1, the air conveyor apparatus is indicated generally by the reference character C. The air conveyor apparatus C is shown with a plastic bottle container, indicated generally by the reference character B. The bottle container B is of the type having a narrow neck portion N, an annular rim or neck ring R around the neck portion N, and a body J below he neck portion N.

The air conveyor C includes a pair of flanges F that are spaced laterally from one another defining an elongate slot between the flanges. The spacing between the flanges F is sufficiently large to enable the neck portion N of the bottle container B just below the neck ring R to pass through the spacing with the bottle container suspended from upper surfaces U of the flanges F by the neck ring R engaging on the upper surfaces U. A series of air ducts D are positioned along the length of the conveyor C adjacent the flanges F. An air plenum of the air conveyor (not shown) supplies a flow of air to the air ducts D. The air ducts D are oriented so that air ejected from the ducts will contact the plastic bottle containers B, thereby pushing the bottle containers B along the pathway defined by the flanges F with the neck rings R of the bottle containers B sliding along the upper surfaces U of the spaced flanges F.

Preferably, such air conveyors transport a plurality of bottle containers in closely spaced succession and at a substantial speed. A typical air conveyor is constructed with both straight sections and curved sections in order to transport the succession of bottle containers from one area to another. Air conveyors often have guide rails for limiting the side-to-side movement of the bottle containers being conveyed. The air conveyor C shown in FIG. 1 includes guide rails G positioned below the flanges F on opposite sides of the conveying path defined by the flanges F. The guide rails G are spaced further apart from each other than are the flanges F to allow the width of a bottle container body J suspended from the flanges F to pass easily between the guide rails G. The guide rails G limit the side-to-side movement of the bottle containers B conveyed by the air conveyor C and thereby limit the extent to which the bodies J of the bottle containers can swing outwardly or transversely from the conveying path, e.g., when the air conveyor rounds a curve. Such guide rails help to avoid a bottle container neck or neck ring becoming jammed in the slot between the support flanges.

With a typical air conveyor being capable of transporting a large succession of plastic bottle containers at a considerable rate of speed, spacings between the support flanges and guide rails must be precise in order to ensure efficient operation. Thus, the spacings between the support flanges and guide rails must be calibrated precisely during initial assembly of the air conveyor apparatus, and must also be recalibrated periodically in order to maintain the proper spacing. In addition, the spacings of the support flanges and guide rails must be calibrated each time the conveyor is to be used to transport bottle containers of different dimensions.

Thus, a calibration tool is needed for setting and maintaining the proper spacing between the support flanges and guide rails of an air conveyor apparatus. It is desirable that the tool have a simple construction that allows it to be moved into position between the support flanges and/or guide rails at virtually any point along the length of the conveyor.

SUMMARY OF THE INVENTION

The spacing tool of the present invention can be employed with virtually any type of air conveyor system that conveys articles along a conveying path. In the operative environment of the invention to be described, the tool is used with an air conveyor that transports plastic bottle containers. The bottle containers are of a conventional type with each bottle having a narrow neck portion at its upper end, an annular rim or neck ring around the neck portion, and a body below the neck portion.

The air conveyor with which the spacing tool of the invention is described employs a pair of spaced flanges through which the neck and neck ring of the bottle container project. The neck ring rests on upper surfaces of the spaced flanges, thereby suspending the body of the bottle container below the flanges. The air conveyor includes a series of air ducts that direct a supply of air against the bottle containers causing the bottle containers to move along the length of the air conveyor with the neck ring of each bottle container sliding along the upper surfaces of the flanges. Air conveyors of this type are described in the Ouellette U.S. Pat. No. 5,437,521, issued Aug. 1, 1995, U.S. Pat. No. 5,611,647 issued Mar. 18, 1997, and U.S. Pat. No. 5,628,588, issued May 13, 1997, each of which is assigned to the assignee of the present invention and incorporated herein by reference.

Air conveyors typically include a framework that supports the conveyor. They also often include guide rails that are supported from the framework or suspended from the air conveyor in positions just below the conveying slot that is defined by the flanges. The guide rails typically extend along the length of the conveyor with a spacing between the guide rails that is centered below the spacing between the flanges. The spacing between the guide rails is slightly larger than the body of the bottle containers to be conveyed by the air conveyor. The guide rails limit the extent to which bottle containers conveyed by the air conveyor can rock side-to-side or transversely to their direction or path of conveyance.

In general, a spacing tool of the present invention is adapted for use with a conveyor of the type described above. The spacing tool comprises a spacing member having a head portion, a neck portion below the head portion, and a spacing block below the neck portion. The head portion has a first outer diameter dimension larger than the spacing between the flanges. The neck portion has a second outer diameter dimension smaller than the spacing between the flanges. Thus, the spacing member can be supported with the head portion in engagement with the upper surfaces of the flanges, with the neck portion between the flanges, and with the spacing block suspended below the flanges adjacent the guide rails. The spacing block has a third outer diameter dimension substantially equal to the outer diameter dimension of each container body (i.e., slightly larger than the container outer diameter dimension to allow for clearance of the containers between the guide rails) so that the spacing block can be used to calibrate the lateral spacing between the guide rails.

In another aspect of the invention, a spacing tool comprises a spacing member having a head portion and a neck portion below the head portion. The head portion has a cross-sectional configuration with a major lateral dimension and a minor lateral dimension. The minor lateral dimension of the head portion is smaller than the spacing between the flanges. Thus, the head portion is allowed to pass between the flanges when the spacing member is oriented so that the major lateral dimension is aligned with the pair of flanges and the minor lateral dimension of the head portion is transverse to or generally perpendicular to the flanges. The major lateral dimension of the head portion is larger than the spacing between the flanges. Thus, the spacing member can be supported with the neck portion between the flanges and with the head portion in engagement with the upper surfaces of the flanges when the spacing member is oriented so that the major lateral dimension is positioned transverse to or generally perpendicular to the pair of flanges and the minor lateral dimension of the head portion is aligned with the pair of flanges. The neck portion of the spacing member has an outer diameter dimension substantially equal to the outer diameter dimension of each container neck (i.e., slightly larger than the outer diameter dimension of each container neck to allow for clearance of the container necks between the flanges) so that the spacing member can be used to calibrate the lateral spacing between the flanges.

While the principal advantages and features of the present invention have been described above, a more complete and thorough understanding and appreciation for the invention may be attained by referring to the drawings and detailed description of the preferred embodiments, which follow.

BRIEF DESCRIPTION OF THE DRAWINGS

FIG. 3 is a front elevational view of the spacing tool shown in FIG. 2 shown removed from the air conveyor with its head portion extended from the spacing block;

FIG. 4 is a side elevational view of the spacing tool of FIG. 2;

FIG. 5 is a top plan view of the spacing tool of FIG. 2;

FIG. 6 is a bottom plan view of the spacing tool of FIG. 2; and

FIG. 7 is a cross-sectional view of the spacing tool taken along the plane of line 7—7 in FIG. 5.

Reference characters in the written specification indicate corresponding parts throughout the several views of the drawings.

DETAILED DESCRIPTION OF THE PREFERRED EMBODIMENTS

Figure 1:
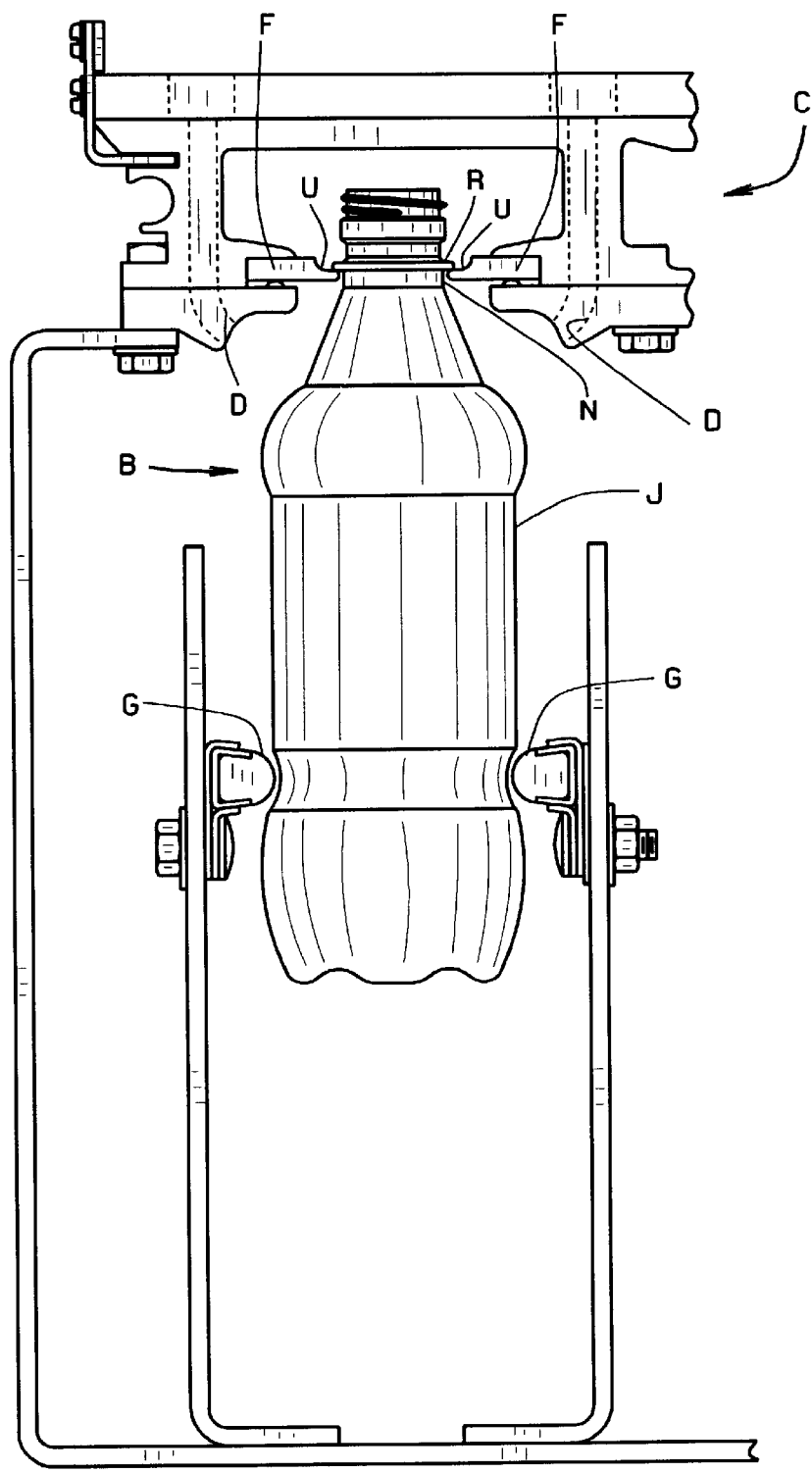
FIG. 1 is an elevational view of an air conveyor apparatus with a plastic bottle container.

A spacing tool of the present invention is indicated generally by the reference numeral 20 in FIGS. 2–7. In general, the spacing tool 20 comprises a head portion 22, a neck portion 24 below the head portion 22, and a spacing block 26 below the neck portion 24. The spacing block is an assembly of three parts including a cylindrical upper portion, a horizontally enlarged middle portion and a guide rail spacing lower portion.

Figure 2:
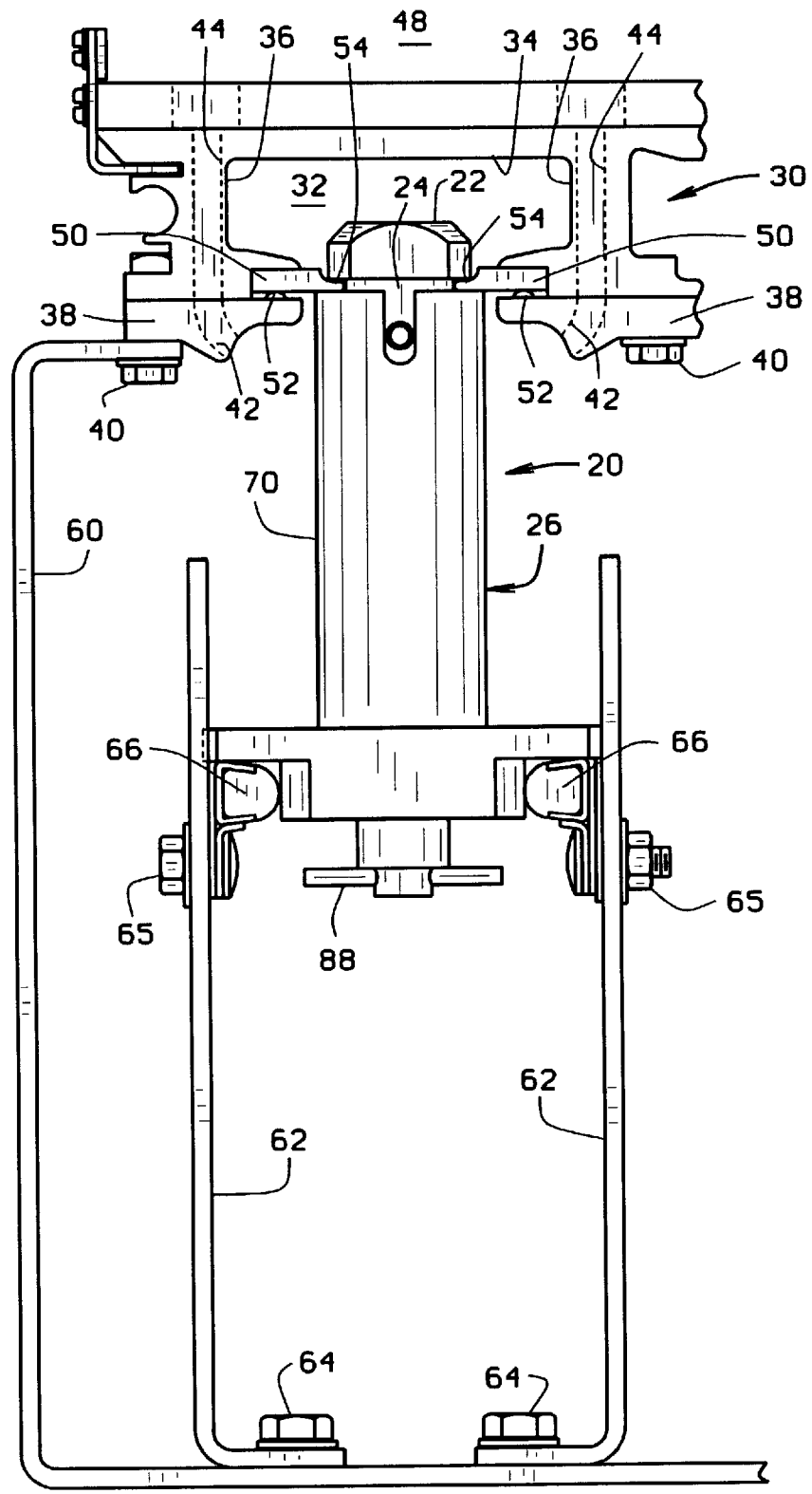
FIG. 2 is an elevational view of the air conveyor apparatus shown in FIG. 1, with a spacing tool of the present invention shown in use installed between the pair of conveyor flanges and with its head portion retracted into the spacing block.

FIG. 2 shows an air conveyor apparatus, indicated generally by the reference numeral 30, which serves as the operative environment of the spacing tool 20 of the present invention. The air conveyor apparatus 30 is similar to the air conveyor apparatus C shown in FIG. 1, and is adapted for transporting plastic bottle containers similar to the plastic bottle container B shown in FIG. 1.

The air conveyor 30 includes a conveyor channel 32 having a generally inverted U-shaped configuration with a top wall 34 and laterally spaced side walls 36. Together, the channel top wall 34 and the side walls 36 give the channel 32 its generally inverted U-shaped configuration surrounding an interior volume of the conveyor channel 32. The side walls 36 of the conveyor channel 32 have lower sections 38 connected to the upper side walls 36 by threaded fasteners 40. The lower sections 38 of the side walls 36 have pluralities of air duct outlets 42. The configurations of the air duct outlets 42 direct jets of air ejected from the outlets to strike the shoulder and body portions (indicated by the reference character J in FIG. 1) of the bottle containers conveyed by the air conveyor 30, thereby forcing the bottle containers to travel in a downstream direction (forward into the page when viewing FIGS. 1 and 2) along the length of the air conveyor 30. Each of the air duct outlets 42 in the side wall lower sections 38 is fed with pressurized air directed through ducts 44 that pass through the upper side walls 36 of the conveyor channel 32. These ducts 44 extend from the top surface of the conveyor channel top wall 34 completely through the side walls 36 to the air duct outlets 42 of the side wall lower sections 38. This construction of the air ducts and air conduits is employed in air conveyors of the type disclosed in the U.S. Pat. No. 5,628,588, referenced above. An air plenum 48 extends longitudinally along the top wall 34 of the channel 32. The plenum 48, which is only partially represented in FIGS. 1 and 2, is an elongated hollow box that surrounds an interior volume of the plenum. The plenum 48 supplies a flow of pressurized air to the air ducts 44 and air duct outlets 42.

With continued reference to FIG. 2, it can be seen that the interior volume of the channel 32 is comprised of an upper portion and a lower portion separated by a pair of laterally spaced, longitudinally extending flanges 50. The flanges 50 extend from the opposed side walls 36 of the channel 32 into the interior volume of the channel and define a slot between the pair of flanges. The flanges 50 are held between the upper portions of the channel side walls 36 and the lower sections 38 of the channel side walls. Set screws 52 are employed to secure the flanges 50 in their positions between the upper portions of the channel side walls 36 and the lower sections 38. By loosening the set screws 52, the opposed flanges 50 can be adjustably positioned laterally toward or away from each other to adjust the lateral spacing between the flanges 50.

In a bottle conveyor of the type shown in FIGS. 1 and 2, the lateral spacing between the flanges 50 is adjusted to be sufficiently large to receive the neck of a bottle container (indicated by the reference character N in FIG. 1) therein with the neck ring (indicated by the reference character R in FIG. 1) of the bottle container supported on upper surfaces 54 of the flanges 50 and with the body of the bottle (indicated by the reference character J in FIG. 1) suspended below the flanges 50.

Suspended below the air conveyor 30 is a plurality of brackets 60. As shown in FIGS. 1 and 2, a top end of each bracket 60 is connected to the underside of the lower section 38 of one of the channel side walls 36 by the threaded fasteners 40. The brackets 60 are spatially arranged along the length of the air conveyor apparatus 30. Pairs of supports 62 are attached to a lower portion of each bracket 60 with mechanical fasteners 64. Each pair of supports 62 projects upwardly and is centered below the flanges 50. The spacing between each pair of supports 62 is sufficiently large to provide ample clearance for a bottle container to pass therethrough, as is shown in FIG. 1. By loosening the mechanical fasteners 64, the supports 62 can be adjustably positioned laterally along the lower portion of the bracket 60 to accommodate containers of different sizes.

Guide rails 66 are mounted to the supports 62 with mechanical fasteners 65. The guide rails 66 extend along the length of the air conveyor 30 and can be provided in sections that are positioned end to end along the length of the air conveyor 30 in the same manner that sections of the air conveyor are positioned end to end. The guide rails 66 limit the extent of side-to-side movement of bottles containers conveyed by the air conveyor 30 and prevent the bottle containers from becoming jammed in the slot between the flanges 50 of the air conveyor 30 by excessive side to side movement. By loosening the mechanical fasteners 65, the guide rails 66 can be adjustably positioned vertically along the supports 62 to accommodate containers of different sizes.

The air conveyor 30, the series of brackets 60, the supports 62, and the guide rails 66 are all suspended from a framework (not shown). The framework extends along and supports the entire length of the air conveyor apparatus 30. Although only a portion of the air conveyor apparatus 30 is represented in FIGS. 1 and 2, air conveyors are constructed with substantial lengths that can curve from side to side and incline upwardly and downwardly along their lengths.

The air conveyor apparatus described to this point is of the type disclosed in the earlier referenced patents and many of the component parts of the air conveyor apparatus described are found in various different types of air conveyors. It should be understood that the air conveyor described is only one operative environment of the spacing tool 20 of the present invention and that the spacing tool 20 may be employed in different types of air conveyors having constructions that are different from the construction of the air conveyor described herein. The air conveyor apparatus 30 is only one operative environment of the spacing tool 20 and the spacing tool 20 is not limited to use with air conveyors of the type described.

As shown in FIG. 3, the head portion 22 of the spacing tool 20 has an outer diameter dimension $N_1$ and the neck portion 24 has an outer diameter dimension $N_2$. Preferably, the head portion 22 and neck portion 24 are fixedly connected to one another so that the head portion 22 and neck portion 24 are generally not movable relative to one another. More preferably, the head portion 22 and neck portion 24 are of a monolithic (i.e., one-piece) construction. The dimension $N_1$ is larger than the spacing between the flanges 50 and the dimension $N_2$ is smaller than the spacing between the flanges 50. Therefore, as shown in FIG. 2, the spacing tool 20 can be supported with the head portion 22 in engagement with the upper surfaces 54 of the flanges 50, with the neck portion 24 between the flanges 50. As shown in FIG. 2, when the spacing tool 20 is supported with the head portion 22 in engagement with the upper surfaces 54 of the flanges 50, the spacing block 26 is suspended below the flanges 50 adjacent the guide rails 66.

As shown in FIG. 5, the head portion 22 of the spacing member has a cross-sectional configuration with a major lateral dimension $D_1$ (equal to the outer diameter dimension $N_1$) and a minor lateral dimension $D_2$. The minor lateral dimension $D_2$ is smaller than the spacing between the flanges 50 to allow the head portion 22 to pass between the flanges 50 when the spacing tool 20 is oriented so that the major lateral dimension $D_1$ is aligned with the pair of flanges and the minor lateral dimension $D_2$ of the head portion 22 is generally perpendicular to the flanges 50. The major lateral dimension $D_1$ of the head portion 22 is larger than the spacing between the flanges 50 so that the spacing tool 20 can be supported (as shown in FIG. 2) with the neck portion 24 between the flanges 50 and with the head portion 22 in engagement with the upper surfaces 54 of the flanges 50 when the spacing tool 20 is oriented so that the major lateral dimension $D_1$ is transverse to or generally perpendicular to the pair of flanges 50 and the minor lateral dimension $D_2$ of the head portion 22 is aligned with the pair of flanges 50. As shown in FIGS. 3 and 5, the head portion 22 preferably includes a beveled upper perimeter 68 that facilitates movement of the head portion 22 upwardly through the spacing between the flanges 50 to move the spacing tool 20 into position between the flanges 50.

The outer diameter dimension $N_2$ of the neck portion 24 can be made substantially equal to the outer diameter dimension of the neck portions of the bottle containers to be conveyed by the air conveyor 30 (i.e., slightly larger than the outer diameter dimension of the neck portions of the bottle containers to allow for clearance of the neck portions of the containers between the flanges) so that the spacing tool 20 can be used to calibrate the spacing between the flanges 50.

As shown in FIGS. 3–7, the spacing block 26 has a generally cylindrical upper portion 70, a generally flat middle portion 72, and a lower portion 74. Preferably, the middle portion 72 and the lower portion 74 are of a monolithic (i.e., one-piece) construction, which is connected to the cylindrical upper portion 70 with mechanical fasteners 76.

As shown in FIG. 6, lower portion 74 of the spacing block 26 preferably has a cross-sectional configuration with a major lateral dimension $D_3$ and a minor lateral dimension $D_4$. The minor lateral dimension $D_4$ is smaller than the spacing between the guide rails 66 to allow the spacing block middle 72 and lower 74 portions to be freely moved into and out of position between the guide rails 66 when the spacing block 26 is oriented so that the lower portion major lateral dimension $D_3$ is aligned with the guide rails 66 and the minor lateral dimension $D_4$ of the lower portion is transverse to or generally perpendicular to the guide rails 66. The major lateral dimension $D_3$ of the spacing block lower portion 74 is substantially equal to an outer diameter dimension of the body portion of the bottle containers to be conveyed by the air conveyor 30 (i.e., slightly larger than the outer diameter dimension of the body portion of the bottle containers to allow for clearance of the bottle containers between the guide rails 66). Thus, the spacing tool 20 can be used to calibrate the lateral spacing between the guide rails 66 when the spacing block lower portion 74 is oriented so that the major lateral dimension $D_3$ of the lower portion is transverse to or generally perpendicular to the guide rails 66.

In the preferred embodiment of the invention, the spacing block 26 and head portion 22 are vertically adjustable relative to each other. As shown in FIG. 7, the spacing block 26 further comprises an externally threaded member 80 that extends through axial bores in the upper portion 70, middle portion 72, and lower portion 74 of the spacing block 26. Preferably, the externally threaded member 80 is journalled for rotation in the spacing block 26 by an upper collar 82 positioned above the middle portion 72 of the spacing block 26 and a lower collar 84 positioned below the lower portion 74 of the spacing block 26. The collars 82 and 84 are mounted to the externally threaded member 80 by set screws 86 (see FIG. 3). The lower collar 84 is adapted for engagement with the lower portion 74 of the spacing block 26 to limit upward movement of the externally threaded member 80 relative to the spacing block 26, and the upper collar 82 is adapted for engagement with the middle portion 72 of the spacing block 26 to limit downward movement of the externally threaded member 80 relative to the spacing block 26. Preferably, the externally threaded member 80 includes a hand-engageable actuator member 88 operatively connected to a lower end of the externally threaded member 80 for manual engagement by a user for rotating the externally threaded member 80 relative to the spacing block 26.

As shown in FIG. 7, the neck portion 24 includes an internally threaded portion 90 extending from a lower side of the neck portion toward the head portion 22. The internally threaded portion 90 is sized to receive an externally threaded upper end 92 of the externally threaded member 80 so that the spacing block 26 and head portion 22 are connected to one another in a threaded engagement. Preferably, the externally threaded member 80 and internally threaded portion 90 are adapted for movement relative to one another in a manner so that rotation of the externally threaded member 80 relative to the internally threaded portion 90 effectuates vertical movement of the head portion 22 relative to the spacing block 26. Because the externally threaded member 80 is journalled for rotation in the spacing block 26 by the upper and lower collars 82 and 84, rotational movement of the externally threaded member 80 relative to the internally threaded portion 90 does not require rotational movement of the remainder of the spacing block 26. Therefore, the externally threaded member 80 can be rotated relative to the internally threaded portion 90 to effectuate vertical movement of the head portion 22 relative to the spacing block 26 without requiring rotational movement of the remainder of the spacing block 26 relative to the head portion 22.

Thus, the head portion 22 is vertically adjustable relative to the spacing block 26 between a generally retracted condition (shown in FIG. 2) and a generally extended condition (shown in FIG. 3) by rotating the externally threaded member 80 relative to the internally threaded portion 90.

As shown in FIG. 2, when the head portion 22 is in a fully retracted position relative to the spacing block 26, the flanges 50 are clamped between the head portion 22 and the upper portion 70 of the spacing block 26. Once the spacing tool 20 is moved to a desired location along the pair of conveyor flanges 50 with the head portion 22 resting on the flanges, the externally threaded member 80 is rotated via the hand-engageable actuator member 88 to move the head portion 22 to its retracted condition. In this way, the spacing tool 20 can be locked to the pair of flanges at a desired location along the conveyor 30 while the positions of the guide rails 66 are adjusted. To unlock the spacing tool 20, the head portion 22 can be moved back toward its extended condition by rotating the hand-engageable actuator member 88 in the opposite direction.

As shown in FIGS. 3 and 5, the neck portion 24 preferably includes at least one projection in the form of a pin 94 extending generally horizontally therefrom. As best shown in FIG. 3, the generally cylindrical upper portion 70 of the spacing block 26 includes a recess in the form of a vertically disposed groove 96 that extends from a top end of the upper portion 70 of the spacing block 26 toward the middle portion 72. The vertical groove 96 is adapted to receive the pin 94 in a manner for permitting vertical movement of the head portion 22 between its extended and retracted conditions relative to the spacing block upper portion 70, but for preventing rotational movement of the head portion 22 relative to the spacing block upper portion 70.

As best shown in FIGS. 3 and 7, enlarged middle portion 72 of the spacing block 26 includes shoulders 98 that extend laterally beyond the lower portion 74 of the spacing block 26. Preferably, the shoulders 98 have an outer diameter dimension $N_3$ that is larger that the spacing between the guide rails 66. The shoulders 98 each have a generally horizontal lower surface 100 adapted for engagement of each shoulder on one of the guide rails 66 in a manner that positions the spacing block lower portion 74 between the guide rails 66 for calibrating the vertical position of the guide rails 66 relative to the flanges 50 and the horizontal spacing between the guide rails 66 as well as centering the guide rails relative to the flanges when the spacing tool 20 is supported between the flanges (as shown in FIG. 2). With the spacing tool 20 positioned as shown in FIG. 2 with the spacing block lower portion 74 positioned with its major lateral dimension $D_3$ extending between the guide rails 66, the guide rails 66 can be moved inwardly toward each other until they engage opposite sides of the lower portion 74, thereby horizontally adjusting the spacing between the guide rails 66 for the particular bottle body diameter corresponding to the spacing block lower portion 74.

Furthermore, the head portion 22 and neck portion 24 are separable from the spacing block 26 by rotating the externally threaded member 80 relative to the internally threaded portion 90 of the neck portion 24 until the external threads of the externally threaded member 80 disengage the internal threads of the internally threaded portion 90. Thus, the head portion 22 and spacing block 26 can be selectively interchanged with like components (not shown) having different lengths and outer diameter dimensions. To adjust for bottle bodies having different diameter dimensions, the shoulder 98 which comprises middle 72 and lower 74 portions of the spacing block can be removed and replaced with others having dimensions that correspond to the body diameter dimension of the bottle.

In view of the above, it will be seen that improvements over the prior art have been achieved and other advantageous results attained. As various changes could be made without departing from the scope of the invention, it is intended that all matter contained in the above description or shown in the accompanying drawings shall be interpreted as illustrative and not in a limiting sense. It should be understood that other configurations of the present invention could be constructed, and different uses could be made, without departing from the scope of the invention as set forth in the following claims.

What is claimed is:

1. A spacing tool for use with a conveyor that conveys containers, each container having a neck ring, a neck below the neck ring, and a body below the neck, the conveyor having a pair of spaced flanges extending generally parallel to one another in a downstream direction of the conveyor, the flanges being spaced laterally from one another by a distance smaller than an outer diameter dimension of each container neck ring but larger than an outer diameter dimension of each container neck so that each container can be supported between the flanges with its neck ring in engagement with upper surfaces of the flanges, the conveyor having a pair of container guide rails below the flanges and extending generally parallel to one another in the downstream direction, the guide rails being spaced from one another by a distance larger than an outer diameter dimension of each container body so that each container can move in the downstream direction along the conveyor between the guide rails, the spacing tool comprising:

a spacing member having a head portion, a neck portion below the head portion, and a spacing block below the neck portion, the head portion having a first outer diameter dimension larger than the spacing between the flanges and the neck portion having a second outer diameter dimension smaller than the spacing between the flanges so that the spacing member can be supported with the head portion in engagement with the upper surfaces of the flanges, with the neck portion between the flanges, and with the spacing block suspended below the flanges adjacent the guide rails, the spacing block having a third outer diameter dimension substantially equal to the outer diameter dimension of each container body so that the spacing member can be used to calibrate the lateral spacing between the guide rails.

2. The spacing tool of claim 1 wherein the spacing block has a cross-sectional configuration with a major lateral dimension that constitutes the third outer diameter dimension and a minor lateral dimension that is smaller than the major lateral dimension, the minor lateral dimension of the spacing block being smaller than the spacing between the guide rails to allow the spacing block to be freely moved into and out of position between the guide rails when the spacing block is oriented so that the minor lateral dimension of the spacing block is generally perpendicular to the guide rails, the major lateral dimension of the spacing block being substantially equal to the outer diameter dimension of each container body so that the spacing member can be used to calibrate the spacing between the guide rails when the spacing block is oriented so that the major lateral dimension of the spacing block is generally perpendicular to the guide rails.

3. The spacing tool of claim 1 wherein the head portion of the spacing member has a cross-sectional configuration with a major lateral dimension and a minor lateral dimension, the minor lateral dimension of the head portion being smaller than the spacing between the flanges to allow the head portion to pass vertically between the flanges when the spacing member is oriented so that the minor lateral dimension of the head portion is generally perpendicular to the flanges, the major lateral dimension of the head portion being larger than the spacing between the flanges so that the spacing member can be supported by the flanges with the head portion in engagement with the upper surfaces of the flanges when the spacing member is oriented so that the minor lateral dimension of the head portion is not generally perpendicular to the flanges, the second outer diameter dimension being substantially equal to the outer diameter dimension of each container neck so that the spacing member can be used to calibrate the lateral spacing between the flanges.

4. The spacing tool of claim 1 wherein the neck portion and spacing block are separable from one another to allow them to be selectively interchanged with like components having different outer diameter dimensions.

5. The spacing tool of claim 1 wherein the spacing member includes at least one shoulder extending laterally therefrom, the shoulder having a generally horizontal surface adapted for engagement with one of the guide rails in a manner for calibrating the vertical position of the one of the guide rails relative to the flanges.

6. The spacing tool of claim 1 wherein the head portion and neck portion of the spacing member are of a monolithic construction.

7. The spacing tool of claim 1 wherein the spacing block and head portion are vertically adjustable relative to each other.

8. The spacing tool of claim 7 wherein one of the spacing block and head portion includes an externally threaded member and the other of the spacing block and head portion includes an internally threaded member, and wherein the spacing block and head portion are connected to one another in a threaded engagement in a manner so that rotation of the externally threaded and internally threaded members relative to one another effectuates vertical movement of the spacing block relative to the head portion.

9. The spacing tool of claim 8 wherein the externally threaded member is operatively connected to one of the spacing block and head portion in a manner so that rotational movement of the externally threaded member relative to the internally threaded member does not require rotational movement of an outer portion of the spacing block relative to an outer portion of the head portion.

10. The spacing tool of claim 9 wherein the externally threaded member is journalled for rotation in the spacing block in a manner so that the externally threaded and internally threaded members can be rotated relative to one another to effectuate vertical movement of the spacing block relative to the head portion without requiring rotational movement of the outer portion of the spacing block relative to the outer portion of the head portion.

11. The spacing tool of claim 10 further comprising an actuator member operatively connected to the externally threaded member, the actuator member being adapted for manual engagement by a user for moving the externally threaded member relative to the internally threaded members to effectuate vertical movement of the spacing block relative to the head portion.

12. The spacing tool of claim 9 wherein the head portion and neck portion of the spacing member are fixedly connected to one another and wherein one of the spacing block and neck portion includes a projection and the other of the spacing block and neck portion includes a recess adapted to receive the projection in a manner for preventing rotational movement of the outer portion of the spacing block relative to the outer portion of the head portion.

13. The spacing tool of claim 12 wherein the recess is an elongate groove that is sized to allow vertical movement of the projection therethrough as the spacing block and head portion move vertically relative to one another.

* * * * *